UNITED STATES PATENT OFFICE.

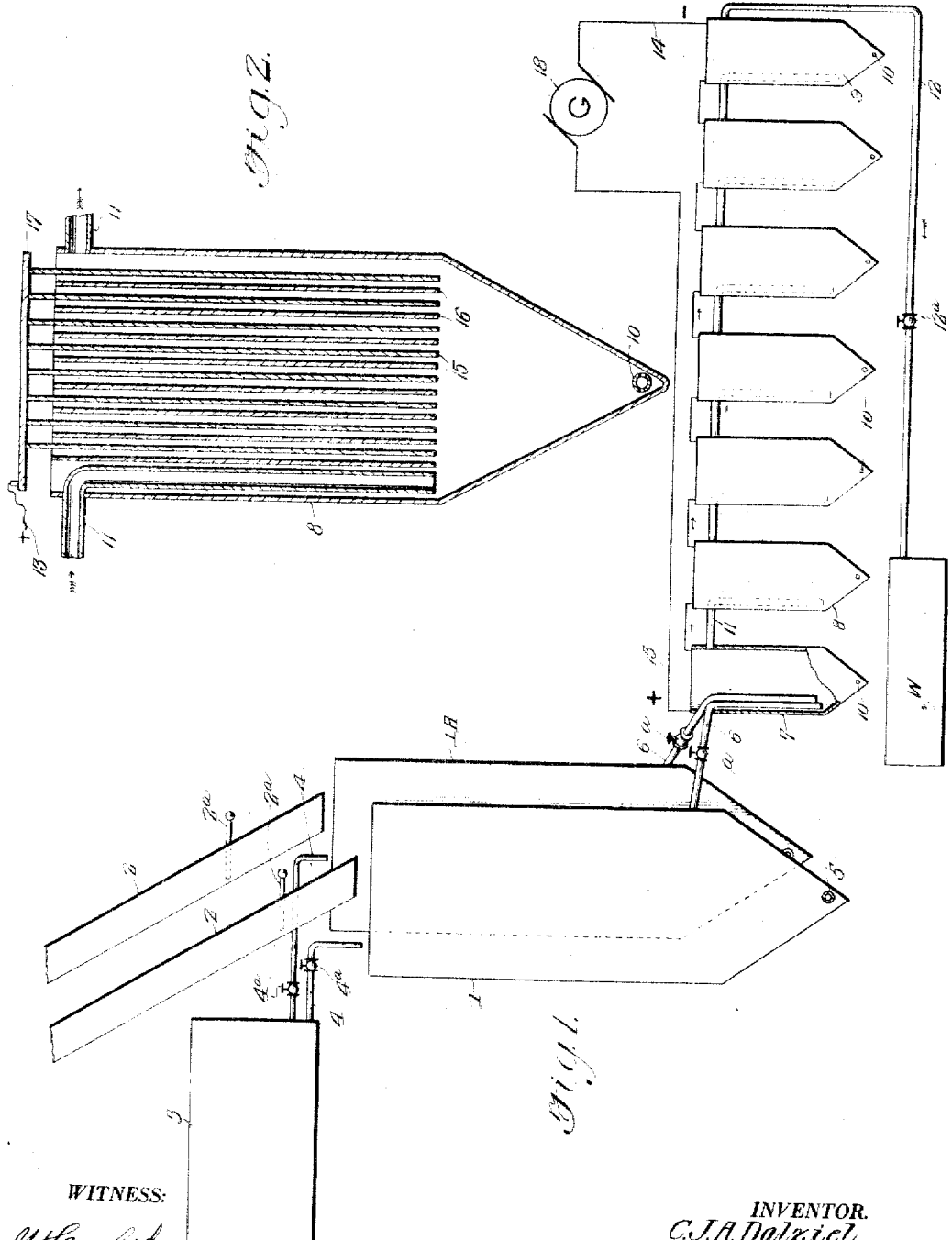

CHARLES JOSEPH ALBERT DALZIEL, OF LONDON, ENGLAND.

PROCESS OF EXTRACTING METALS.

1,344,681.   Specification of Letters Patent.   Patented June 2, 1920.

Application filed January 17, 1920. Serial No. 352,051.

*To all whom it may concern:*

Be it known that I, CHARLES JOSEPH ALBERT DALZIEL, a subject of the King of Great Britain, whose residence is in London, England, have invented certain new and useful Improvements in Processes of Extracting Metals, of which the following is a specification.

The present invention relates to the recovery of metals from their ores, and is applicable to the treatment of ores of a number of different kinds, in which the ore is pulped with an appropriate leaching solution and the pulp is passed through a series of electrolytic cells for the deposition of the metal.

The object of the invention is to secure a very complete extraction of the metal content of the ores with the employment of a minimum quantity of the chemical leaching solution.

The invention, broadly stated, is a process in which the finely-divided ore from a crushing apparatus or stamp mill, either with or without any desired preliminary operation such as roasting, concentrating or the like, if desired or necessary, is mixed with a leaching solution of such a character and in such quantity as to dissolve a portion of the metal content of the ore. It is desirable not to employ such an amount of the reagent as would be necessary after neutralizing or satisfying other chemically active substances present to dissolve the entire amount of metal, (existing as free metal or compounds) present in the ore treated, but since this agent is regenerated in the electrolytic cells a fraction of the theoretical quantity of the reagent is sufficient for carrying out the process.

According to the invention the metal is extracted and precipitated directly from the ore in a single continuous operation, without the customary filtration at any stage of the operation. The ore is supplied to one or more preparatory vessels and a suitable leaching solution is supplied to the same vessels, and the mixture of ore and leaching solution is then agitated and aerated by a blast of air introduced continuously at the bottom of the preparatory vessel. The thoroughly agitated mixture is then fed through a series of electrolytic cells in which the pulp is likewise agitated and aerated continuously by a blast of air introduced at the bottom of each of said cells to thereby prevent separation or sedimentation in the cells, which would otherwise be likely to occur.

The accompanying drawing shows an apparatus in which the process of the present invention may be conveniently carried out. In such drawing, Figure 1 is a diagrammatic side elevation of the entire apparatus, and Fig. 2 is a vertical section of one of the electrolytic cells.

Ore is fed into the preparatory vessels 1 and 1$^A$ through chutes 2 in regulated quantities. Valves or gates 2$^a$, as indicated, regulate the flow of the ore. A leach solution is fed to each preparatory vessel from a tank 3 through pipes 4 each provided with a valve 4$^a$, the amount of solution fed being such as to produce a thin flowable pulp in the preparatory vessels. I prefer to introduce the ore and the solution simultaneously so that there will be more or less agitation or mixing produced by the materials themselves as they enter the preparatory vessel or vessels.

In order to produce a complete suspension of the ore in the preparatory vessels a blast of air is introduced through a perforated pipe 5 at the bottom of each vessel. The air thus introduced produces aeration and agitation of the pulp so that a more or less homogeneous flowable pulp is produced and the ore particles are held at all times in suspension. The air thus introduced also serves to some extent to aid solution of the metal contained in the suspended ore.

The pulp being thus thoroughly aerated and agitated is allowed to flow off through the pipes 6 having valves $a$ into the first of a series of electrolytic cells or vats 7, 8, etc., to 9, these cells being provided with insoluble anodes 15 and suitable cathodes 16, and are provided with an air blast 10 located at the bottom of each vessel for the purpose of maintaining the ore in suspension therein and for agitating and aerating it. The liquid flows from cell to cell through suitable overflow connections 11 and the exhausted ore is drawn off through a pipe 12 provided with a regulating valve 12$^a$. Suitable electrical connections are provided at 13 ar 14 for the anodes and cathodes.

The anodes are connected to a suitable support 17, connected to the positive wire of a suitable generator 18, or other source of electricity, and the cathodes are properly connected to the negative wire 14 of the circuit.

It will be observed that I do not necessarily at any stage of the operation subject the pulped ore to the customary filtration or clarifying operations which are expensive, not only in the apparatus employed but also in the attendance required. It will be observed that I need not, at any stage of the process, heat or boil the liquor. The entire operation taking place in the apparatus illustrated is ordinarily conducted at normal atmospheric temperature. I thereby avoid the expense incident to heating the liquors, and to maintaining said liquors in a heated state. The number of electrolytic cells depends upon the speed of flow desired and the time required to deposit substantially the entire amount of recoverable metal contained in the ore.

In practice it is advisable after starting the operation to introduce continuously in regulated amounts the finely crushed ore through the chutes 2 and regulated amounts of liquid from the tank 3, thereby maintaining a full supply of the ore and liquid in the preparatory vessels. In this way the overflow through pipe 6 and the passage of the liquid through the pipes 11 and discharge pipe 12 is made continuous and requires little service from an attendant.

The process is, as above stated, applicable to the treatment of a number of different kinds of ores. In the treatment of gold and silver ores, given here by way of example, a suitable leaching solution such as potassium cyanid, sodium cyanid or calcium cyanid, is introduced from the tank 3 into one of the two preparatory vessels 1 or 1ᵃ, by means of valved pipes 4, while air is introduced continuously through the perforated pipe 5 located in the bottom of each of the preparatory vessels. The ore is introduced through the chute 2 into the said vessel in an intermittent or preferably in a continuous manner. The amount of cyanid in the leaching solution supplied to the preparatory vessels need not be more than a fraction of the amount theoretically necessary (after neutralizing or satisfying other chemically active substances present) to dissolve during the process the entire precious metal content of the ore. The ore pulp thereby produced is fed through the pipe 6 into the first electrolytic cell 7 and this pulp flows successively through the cells 7, 8, etc., up to 9, and is then discharged through the pipe 12 to waste, or may be allowed to flow into some suitable well, pond or cistern W. During this operation current is supplied by the leads 13 and 14 connected to the generator 18 or other suitable source of electric current, and during this operation, the gold and silver in solution are precipitated upon the cathodes regenerating the cyanid, which in turn acts upon a further amount of gold or silver (or both) in the ore to dissolve the same, producing a soluble double cyanid which is in turn decomposed with the deposition of gold or silver on the cathodes and regeneration of cyanid, and this operation continues until the cyanidizable metal content of the ore has been exhausted to any desired extent, after which the barren pulp flows out through pipe 12 regulated by the valve 12ᵃ.

The neutralization or satisfying of the chemically active materials in the ore, other than the metal being extracted therefrom, (such as iron, arsenic, etc.) may take place in the electrolytic cells as well as in the preparatory vessels.

In the above described operation it is to be understood that other leaching solutions besides cyanid can be employed, depending upon the character of the ore. With copper ores in which the copper is in the oxidized form, dilute sulfuric acid, ammonia water or cyanid solution may be employed as the solvent liquid. If precious metal ores, such as those of gold and silver, are to be employed, cyanid solutions, such as potassium cyanid, sodium cyanid, or calcium cyanid, can be advantageously employed. With many ores dilute hydrochloric acid is a suitable solution to employ, as are also mixed solutions containing acids and salts.

While my process is preferably performed in an apparatus of the kind shown and heretofore described, that is in an apparatus where the materials are passed once through the system, an important feature of this invention consists in employing a leaching solution containing a fraction only of the amount of solvent necessary (after neutralizing or satisfying other chemically active substances present) to dissolve during the process the entire metal content of the ore to be recovered and this feature is separately claimed.

With some ores it will be sufficient to pass the pulp once through the system, but with other ores it may be necessary or desirable, after the pulp has been partially treated by being passed once through the system, to return it to the preparatory vessel to be passed through the system again for further treatment. If necessary, the pulp may be passed a number of times through the system before being finally discharged.

In some cases it may be advisable to employ the gaseous products from roasting sulfid ores, either with or without an additional quantity of air, for introduction into the preparatory vessels and electrolytic cells. In this manner the gaseous blast, introduced through the pipes 5 and 10 can be used to produce the agitation, the aeration and, by absorption of oxids of sulfur, the chemical reagent or a portion thereof, essential for leaching the metal content of the ore. This feature is of especial utility in the treatment of copper ores containing sulfids.

In my copending application No. 255,469, filed September 24, 1918 (of which the present case is in part a continuation), I have claimed the application of the process to the treatment of oxidized copper-bearing sulfid ores, whereas in the present case I claim the application of the process to ores generically, and to precious metal ores specifically.

I claim:

1. A process of treating metalliferous ores, which comprises continuously subjecting the said ore in a finely-divided state, in a leaching solution, at about atmospheric temperature, to agitation produced solely by a blast of air of sufficient intensity and for a sufficient length of time to produce a readily flowable thin pulp, and continuously passing such pulp through a series of electrolytic cells, while agitating the pulp solely by an air blast sufficient to prevent any such amount of sedimentation in the cells as would substantially obstruct the same.

2. A process of treating metalliferous ores, which comprises continuously subjecting the said ore in a finely-divided state, in a leaching solution containing a reagent capable of reacting with the metal content of said ore, the amount of such reagent above that required to neutralize or satisfy the other chemically active ingredients of the ore being only a fraction of the amount which would correspond to the amount of metal in said ore, to agitation produced solely by a gaseous blast of sufficient intensity and for a sufficient length of time to produce a readily flowable thin pulp, and continuously passing such pulp through electrolytic cells while agitating the pulp by a gaseous blast sufficiently to prevent any such amount of sedimentation in the cells as would substantially obstruct the same.

3. A process of treating precious metal ores which comprises continuously subjecting the said ore in a finely-divided state, in a leaching solution, at about atmospheric temperature, to agitation produced by a gaseous blast of sufficient intensity and for a sufficient length of time to produce a readily flowable thin pulp, and continuously passing such pulp through electrolytic cells, while agitating the pulp solely by a gaseous blast sufficiently to prevent any such amount of sedimentation in the cells as would substantially obstruct the same.

4. A process of treating ores containing gold which comprises substantially subjecting the said ore in a finely-divided state in a leaching solution containing a soluble cyanid, the amount of such cyanid above that required to neutralize or satisfy the other chemically active ingredients of the ore being only a fraction of that amount which would correspond to the amount of gold in the said ore, to agitation and aeration produced by a blast of air of sufficient intensity and for a sufficient length of time to produce a readily flowable thin pulp, and continuously passing such pulp through electrolytic cells, while agitating and aerating the pulp by a blast of air of sufficient intensity to prevent any such amount of sedimentation in the cells as would substantially obstruct the same.

5. A process of extracting a metal from an ore containing the same, which comprises subjecting the finely-divided ore and a cyanid leaching solution containing an amount of cyanid, which is substantially less than that amount which would be chemically equivalent to the metal content of said ore, to sufficient agitation to produce a readily flowable thin pulp, passing such pulp once only through electrolytic cells until the metal content of said pulp is commercially exhausted and discharging the pulp from the system.

6. A process of treating metalliferous ores, which comprises subjecting said ores in a finely-divided state, to a leaching solution, containing a reagent capable of reacting with the metal content of the ore, the amount of which reagent is a fraction only of the amount theoretically necessary (after neutralizing or satisfying other chemically active substances present) to dissolve the entire metal content of the ore.

7. A process of treating metalliferous ores, which comprises subjecting the said ores in a finely-divided state to a leaching solution, containing a reagent capable of reacting with the metal content of the ore, the amount of which reagent is a fraction only of the amount theoretically necessary (after neutralizing or satisfying other chemically active substances present) to dissolve the entire metal content of the ore and continuously passing the pulp through electrolytic apparatus while being subjected to a gaseous blast sufficient to prevent sedimentation in said apparatus.

8. A process of treating metalliferous ores, which comprises subjecting said ores in a finely divided state, in a leaching solution, to agitation produced by the introduction of a gaseous blast containing substances capable of absorption by the leaching solution to produce chemical reagent capable of dissolving the metal content of the ore, such agitation being of sufficient intensity and for a sufficient length of time to produce a readily flowable thin pulp, and thereafter subjecting said pulp to electrolysis for the purpose of depositing the metal to be recovered, while agitating said pulp.

9. A process of treating metalliferous ores, which comprises subjecting said ores in a finely-divided state, in a leaching solution, to agitation produced by the introduction of a gaseous blast containing substances capable of absorption by the leaching solution to produce chemical reagent capable of dissolving the metal content of the ore, such agitation being of sufficient intensity and for a sufficient length of time to produce a readily flowable thin pulp, and thereafter subjecting said pulp to electrolysis for the purpose of depositing the metal to be recovered, while agitating said pulp, by introducing a similar gaseous blast into the same.

In testimony whereof, I have hereunto subscribed my name.

CHARLES JOSEPH ALBERT DALZIEL.